United States Patent [19]
Fisher

[11] Patent Number: 5,938,006
[45] Date of Patent: Aug. 17, 1999

[54] REVERSIBLE DRIVE SYSTEM FOR A CONVEYOR

[76] Inventor: Trent P. Fisher, 317 W. Davis St., Yellow Springs, Ohio 45387

[21] Appl. No.: 08/756,412

[22] Filed: Nov. 27, 1996

Related U.S. Application Data

[60] Provisional application No. 60/007,898, Dec. 1, 1995.

[51] Int. Cl.⁶ .................................................. B65G 15/02
[52] U.S. Cl. .......................................... 198/831; 198/835
[58] Field of Search .................................. 198/831, 835, 198/832

[56] References Cited

U.S. PATENT DOCUMENTS

| | | |
|---|---|---|
| 448,857 | 3/1891 | Harrison . |
| 542,996 | 7/1895 | Dick . |
| 809,373 | 1/1906 | Hof et al. . |
| 1,776,419 | 9/1930 | Dodge . |
| 1,877,194 | 9/1932 | Nyborg et al. . |
| 2,413,339 | 12/1946 | Stadelman . |
| 2,577,926 | 12/1951 | Stiles . |
| 3,067,858 | 12/1962 | Loosli . |
| 3,134,480 | 5/1964 | Loosli . |
| 3,153,475 | 10/1964 | Swanson . |
| 3,184,045 | 5/1965 | Fry . |
| 3,327,839 | 6/1967 | Sigety et al. . |
| 3,779,360 | 12/1973 | Taher et al. . |
| 3,901,379 | 8/1975 | Bruhm . |
| 4,067,439 | 1/1978 | Janitsch . |
| 4,179,026 | 12/1979 | de Vries . |
| 4,227,610 | 10/1980 | Gerdes et al. . |
| 4,350,241 | 9/1982 | Wenzel . |
| 4,875,568 | 10/1989 | Hermann et al. . |
| 4,887,708 | 12/1989 | Brown et al. . |
| 4,955,466 | 9/1990 | Almes et al. . |
| 5,090,550 | 2/1992 | Axmann . |
| 5,332,082 | 7/1994 | Sommerfield . |
| 5,332,083 | 7/1994 | Axmann . |
| 5,341,909 | 8/1994 | Ahls et al. . |
| 5,456,349 | 10/1995 | Axmann . |
| 5,562,199 | 10/1996 | Fisher . |

FOREIGN PATENT DOCUMENTS

| | | |
|---|---|---|
| 669147 | 11/1929 | France . |
| 37 34 560 A1 | 4/1989 | Germany . |
| 766980 | 10/1980 | Russian Federation . |
| 373228 | 10/1970 | U.S.S.R. ................................ 198/835 |
| 13333622 | 8/1987 | U.S.S.R. ................................ 198/835 |
| 1761641 | 9/1992 | U.S.S.R. ................................ 198/835 |
| 609235 | 9/1948 | United Kingdom . |
| 880149 | 10/1961 | United Kingdom . |
| 1146895 | 3/1969 | United Kingdom . |
| 2009076 | 6/1979 | United Kingdom . |

OTHER PUBLICATIONS

Axmann Brochure on Conveyors.
Axmann Brochure on Belt Curves.

*Primary Examiner*—Karen M. Young
*Assistant Examiner*—Thuy V. Tran
*Attorney, Agent, or Firm*—MacMillan, Sobanski & Todd, LLC

[57] ABSTRACT

A reversible drive system for a conveyor includes a belt, a drive wheel and an idler wheel, where the drive wheel and the idler wheel are mounted for rotation on spaced apart axes to define a nip between the drive wheel and the idler wheel, with the belt being pulled through the nip by the rotation of the drive wheel. Also included is a support on which the drive wheel is mounted, the support being mounted to enable a rocking motion, where rocking the support to cause the support to rotate in a first arcuate direction moves the drive wheel and the idler wheel closer to each other, thereby increasing the pinching on the belt passing through the nip. Increased tension on the belt causes rocking of the support which moves the drive wheel and the idler wheel closer to each other to increase the pinch on the belt. Rocking the support to cause the support to rotate in a second arcuate direction moves the drive wheel and the idler wheel closer to each other, thereby increasing the pinching on the belt passing through the nip, wherein increased tension on the belt causes rocking of the support which moves the drive wheel and the idler wheel closer to each other to increase the pinch on the belt.

13 Claims, 9 Drawing Sheets

REVERSIBLE DRIVE SYSTEM FOR A CONVEYOR

This Application claims benefit of provisional application 60/007,898 field Dec. 1, 1995

TECHNICAL FIELD

This invention relates in general to drive systems for conveyors. More particularly, this invention relates to conveyor systems in which a conveyor belt is engaged by the nip created by two rotating wheels, and driven through the nip by the action of the two wheels.

BACKGROUND ART

Conveyors are commonly comprised of a conveyor belt, having an upper or load surface and a lower or return surface, and are mounted for continuous movement around a return roller positioned at each end of the conveyor. Such conveyors are used to transport a myriad of goods, from finely divided particulate matter such as sand, to large and bulky items such as heavy boxes. The drive system for typical conveyors usually comprises a motor connected to one of the return rollers. Advanced or nonstandard conveyor systems include merge, curve and angle conveyors. The belts of these conveyors follow non-standard paths and are of unusual configuration.

The conveyor belt must be stretched tightly around the return rollers in order for the driven return roller to be able to move the belt along its path. By placing the belt under tension, however, various problems arise. These include the need for stronger belts, the faster deterioration of the belts, and the need to cool the belts because of heat generated at points where the belt turns around the return rollers. The problem of excessive heat and consequent belt deterioration for belts under tension is particularly prevalent in such nonstandard conveyors as merge and curve conveyors.

Developments in conveyor technology have led to a drive system which includes a drive wheel and an idler wheel mounted for rotation on spaced apart axes to define a nip which engages the conveyor belt (usually the return portion of the belt) to pull the belt along its path. By driving the belt between the nip of the two wheels, the belt need not be operated under the same degree of tension as in a system in which the driving force is supplied by a return roller. This nip drive system need not be positioned at the ends of the conveyor, but can be positioned any place along the path of travel of the belt.

The nip driving system suffers from the problem that sudden increased loads on the conveyor system can cause the belt to slip rather than be driven through the nip of the two wheels. One improvement in the nip driving system to solve the problem of slip through the nip is to use a spring to bias the drive wheel toward the idler wheel, thereby increasing the pinch on the belt. Also, the drive wheel can be mounted on or supported by one end of an arm which is hinged at the other end for rotation. Rotation of the arm forces the drive wheel toward the idler wheel to increase the pinch on the belt to prevent the belt from slipping though the nip. The axis of the drive wheel, the axis of the idler wheel, and the hinge point of the rotatable arm are configured in such a way that an increase in tension in the belt in the upstream direction or upstream side of the nip pulls on the drive wheel in the upstream direction in a cam-like action to cause rotation of the arm and resulting increase in the pinch of the nip on the belt. This spring/arm support system for a drive wheel can be used successfully to prevent the belt from slipping backwards through the nip when the tension of the belt is suddenly increased. The tension could suddenly increase if a sudden load or increase in load is experienced by the belt.

For various reasons it is desirable to be able to operate conveyor systems as reverse conveyors having belts capable of operating in two directions, i.e., a forward direction and a reverse direction. For example, such a reverse conveyor could be used alternately for loading and for unloading goods. The ability to reverse a conveyor is quite useful in unjamming a jammed conveyor. Further, in complex sorting schemes using multiple conveyors, such as shipping and mail sorting facilities, reversible conveyors enable greater flexibility and efficiency in operation of the system. Conventional conveyors driven by the return rollers are under sufficient tension that they can be reversed. Reversing of these conveyors requires a drive roller on each end. However, low tension conveyor drive wheel spring/arm support systems, which are successful for preventing the belt from slipping backwards upon a sudden increase in tension in the belt, cannot be used on a reversible conveyor since the system is designed for preventing slip in one direction only.

It would be advantageous to be able to provide a conveyor drive system which can operate at low belt tension and yet is capable of being operated in two directions. Such a system should successfully prevent the belt from slipping backwards through the nip when the tension of the belt is suddenly increased. Also, such a system should be able to drive such non-standard conveyors as merges, curves and angle conveyors.

DISCLOSURE OF THE INVENTION

There has now been developed a reversible drive system for a conveyor comprising a belt, a drive wheel and an idler wheel, where the drive wheel and the idler wheel are mounted for rotation on spaced apart axes to define a nip between the drive wheel and the idler wheel, with the belt being pulled through the nip by the rotation of the drive wheel. Also included is a support on which the drive wheel is mounted, the support being mounted to enable a rocking motion, where rocking the support to cause the support to rotate in a first arcuate direction moves the drive wheel and the idler wheel closer to each other, thereby increasing the pinching on the belt passing through the nip. Increased tension on the belt causes rocking of the support which moves the drive wheel and the idler wheel closer to each other to increase the pinch on the belt. Rocking the support to cause the support to rotate in a second arcuate direction moves the drive wheel and the idler wheel closer to each other, thereby increasing the pinching on the belt passing through the nip, wherein increased tension on the belt causes rocking of the support which moves the drive wheel and the idler wheel closer to each other to increase the pinch on the belt.

In a specific embodiment of the invention, the drive system includes a belt, a drive wheel, an idler wheel, where the drive wheel and the idler wheel are mounted for rotation on spaced apart axes to define a nip between the drive wheel and the idler wheel, with the belt being pulled through the nip by the rotation of the drive wheel, and a support on which the drive wheel is mounted, The support is mounted to enable a rocking motion, where rocking the support to cause the support to rotate in a first arcuate direction moves the drive wheel and the idler wheel closer to each other, thereby increasing the pinching on the belt passing through the nip. Increased tension on the belt causes rocking of the support which moves the drive wheel and the idler wheel closer to each other to increase the pinch on the belt.

BEST MODE FOR CARRYING OUT THE INVENTION

Figure 1:
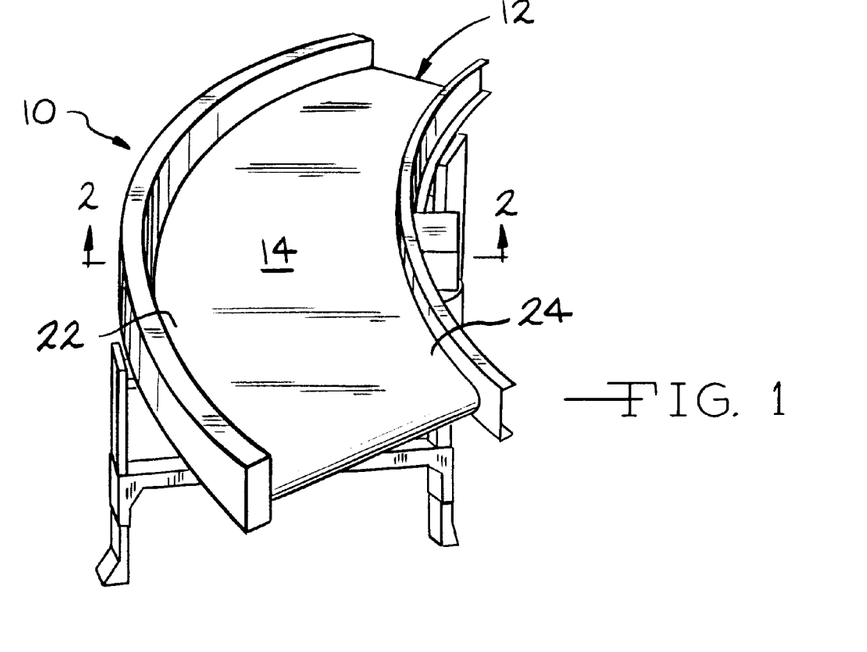
FIG. 1 is a schematic view in perspective of a curved conveyor section having the reversible drive system of the invention.
Figure 2:
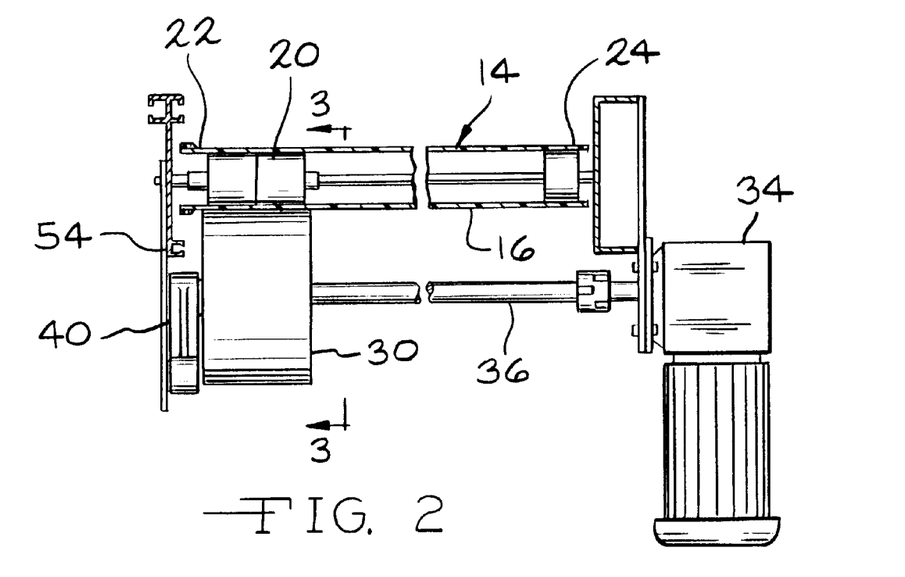
FIG. 2 is schematic cross-sectional view in elevation of the curved conveyor system of FIG. 1, taken along line 2—2.

As shown in FIGS. 1 and 2, a curve conveyor of the invention is generally indicated at 10. The conveyor includes belt 12 which has a top surface 14 and a bottom or return surface 16. The belt is mounted for travel along a path which turns around return rollers positioned at each end of the conveyor. The belt and return conveyors can be mounted on any suitable structure, as is well known to those skilled in the art.

Positioned above the return surface is idler wheel 20 which is mounted for rotation in contact with the belt return surface 16. In the embodiment shown in FIGS. 1–6 the idler wheel is freely rotatable and not driven. In other embodiments the idler wheel may be driven. The idler wheel can be made of any suitable material having good friction with respect to the belt return 16. The idler wheel can be made in two or more sections, and can have a slight taper in diameter to accommodate the fact that the outer surface 22 of the curve conveyor travels farther and faster than the inner surface 24 of the curve conveyor.

Figure 3:
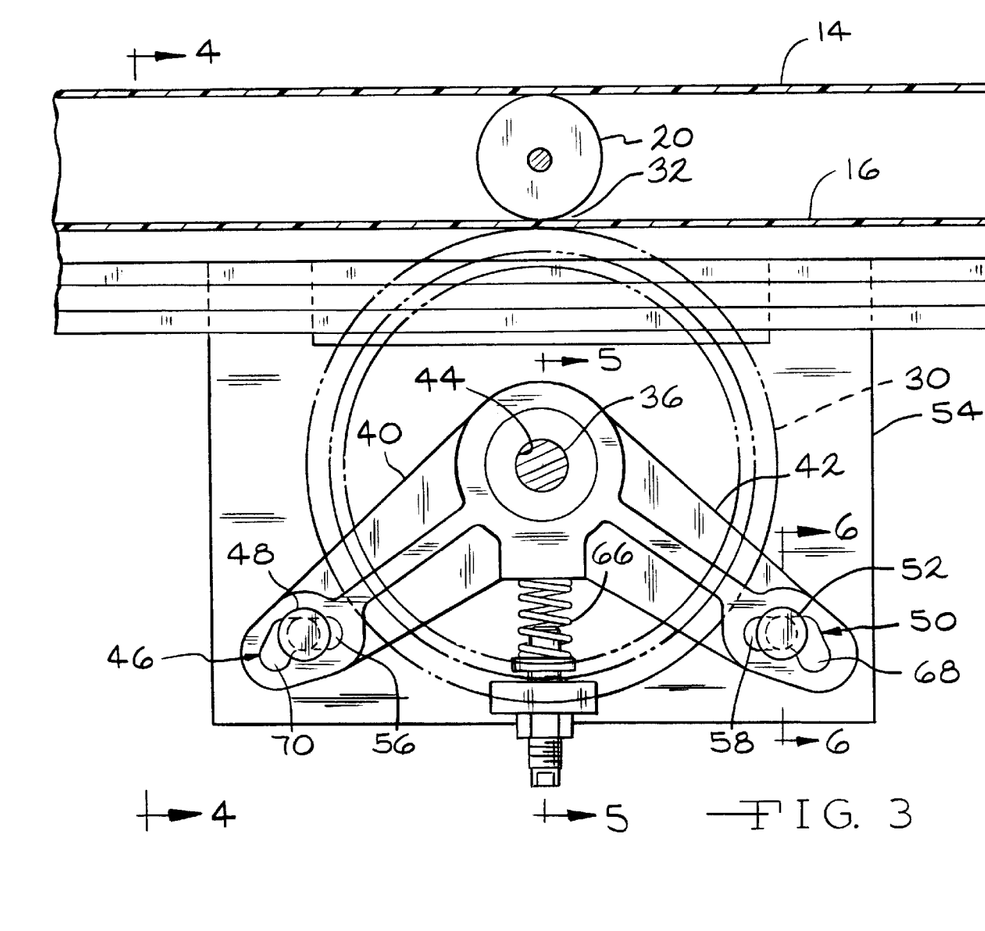
FIG. 3 is a schematic view in elevation of the drive system of the curved conveyor section, taken along line 3—3, but shown in a neutral position.

Positioned beneath the return surface is drive wheel 30, which engages the belt-return surface 16. The drive wheel is mounted for rotation on an axis spaced apart from the axis of the idler wheel. The axis of the drive wheel is preferably generally parallel to the axis of the idler wheel, thereby defining a nip 32 between the two wheels, as best seen in FIG. 3. The drive wheel is shown in FIG. 3 in phantom lines in order to more clearly show other parts of the drive system. The drive wheel can be driven by any suitable means, such as motor 34, via a drive shaft 36, as is conventionally known. The drive wheel can be made of any suitable material, examples of which will be apparent to those skilled in the art. A high friction material is preferred. The drive wheel can also be adapted with a slight taper to accommodate the need for further travel of the belt at the outer edge 22 than at the inner edge 24 of the belt.

The drive wheel 30 is shown in FIGS. 1–6 as being supported by a pair of arms, first arm 40 and second arm 42. The mechanism of support can be any linkage from the arms to the drive wheel. As shown, the arms 40 and 42 are adapted with bores 44 through which the drive shaft 36 protrudes. Although the arms are shown as supporting the drive wheel, the invention can be operated with the arms supporting the idler wheel instead, or with arms supporting both the drive wheel and the idler wheel.

Figures 4, 5, 6:
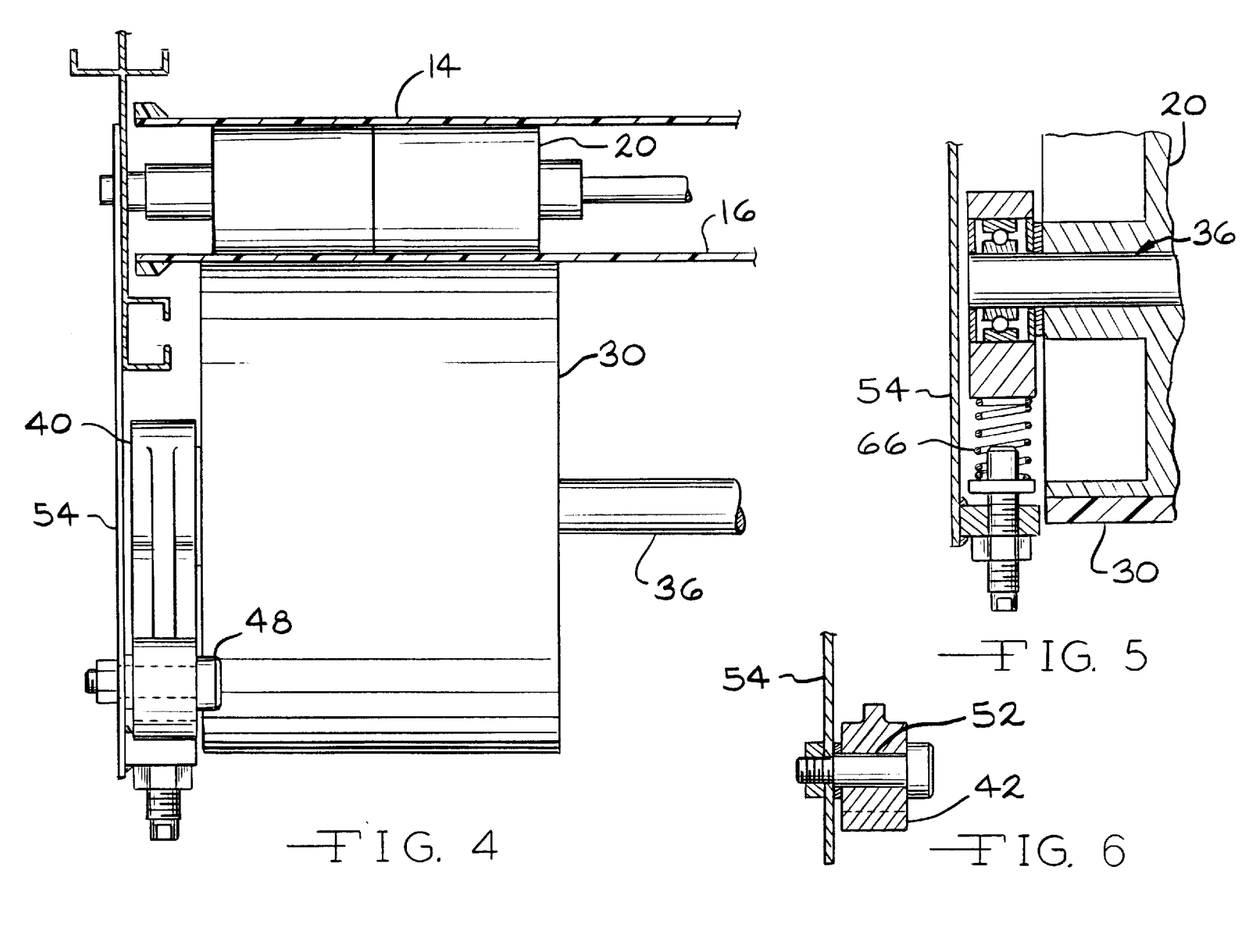
FIG. 4 is a schematic view in elevation taken along line 4—4 of FIG. 3.
FIG. 5 is a cross-sectional view in elevation taken along line 5—5 of FIG. 3.
FIG. 6 is a schematic view in elevation of the hinge point, taken along line 6—6 of FIG. 3.

The first arm 40 is adapted with an opening, such as first slot 46, to enable movement of the arm relative to a first hinge point, such as first hinge pin 48. The first hinge pin is also shown in FIG. 4. Likewise, the second arm 42 is adapted with an opening, such as second slot 50, to enable movement of the second arm about a second hinge point, such as second hinge pin 52, shown in greater detail in FIG. 6. The slots accomplish two purposes. First they provide a seat for the pivoting motion of the arms. Second, they enable freedom of movement for one arm while the other arm is rotating.

An example of the slots providing a seat for the hinge pins is as follows: when the drive wheel shown in FIG. 3 is traveling in a clockwise direction, the first and second arms 40 and 42 will slide over to the left, when viewing FIG. 3, so that the first hinge pin 48 will be seated at the end 56 of first slot 46. When the first hinge pin is seated at the end of the first slot, the first arm has a hinge point about which it can rotate.

When the drive wheel is rotating in a clockwise direction the belt will be traveling in a first direction, from left to right as shown in FIG. 3. The first arm is oriented in the upstream direction with respect to the travel of the belt through the nip, and this first direction is defined as the first direction of travel. The terminology "extending toward a first direction of travel of the belt" means that the arm is pointed or oriented in the upstream direction, i.e., the direction from which the belt is coming.

Sudden increases in the load on the belt will result in sudden increases in the tension of the belt. This sudden increase in the tension of the belt will have the tendency to cause the belt to slip backwards through the nip 32. However, the backwards force of the belt, coupled with the high friction between the belt and the surface of the drive wheel, will cause the first arm 40 to rotate about the first hinge pin 48 in a counter-clockwise direction. This will force the drive wheel upward, thereby causing the drive wheel and the idler wheel to move closer together. This increases the force of the pinch applied to the belt in the nip 32, and the increased pinch prevents the belt from slipping backwards through the nip. This nip drive system prevents the slipping of the belt in a backwards direction when the belt is traveling from left to right when viewing FIG. 3, and yet allows the belt to be free of the high degree of tension associated with traditional conveyors having driven return rollers.

In a manner similar to the action of the first arm, when the drive wheel shown in FIG. 3 is traveling in a counter-clockwise direction, the first and second arms 40 and 42 will slide over to the right, when viewing FIG. 3, so that the second hinge pin will be seated at the end 58 of second slot 50. This will enable the second arm 42 to rotate about second hinge pin 52. The second arm is oriented in the upstream direction (to the right as shown in FIG. 3) with respect to the travel of the belt through the nip (right to left as shown in FIG. 3), and this second direction is defined as the second direction of travel. Sudden increases in the load on the belt will result in sudden increases in the tension of the belt. This sudden increase in the tension of the belt will have the tendency to cause the belt to slip backwards through the nip 32 (to the right when viewing FIG. 3). However, the backwards force of the belt, coupled with the high friction between the belt and the surface of the drive wheel, will cause the second arm 42 to rotate about the second hinge pin 52 in a clockwise direction. This will force the drive wheel upward, thereby causing the drive wheel and the idler wheel to move closer together. This increases the force of the pinch applied to the belt in the nip 32, and the increased pinch prevents the belt from slipping backwards through the nip. This nip drive system prevents the slipping of the belt in a backwards direction when the belt is traveling from right to left when viewing FIG. 3, and yet allows the belt to be free of the high degree of tension associated with traditional conveyors having driven return rollers.

Figures 8, 9, 10:
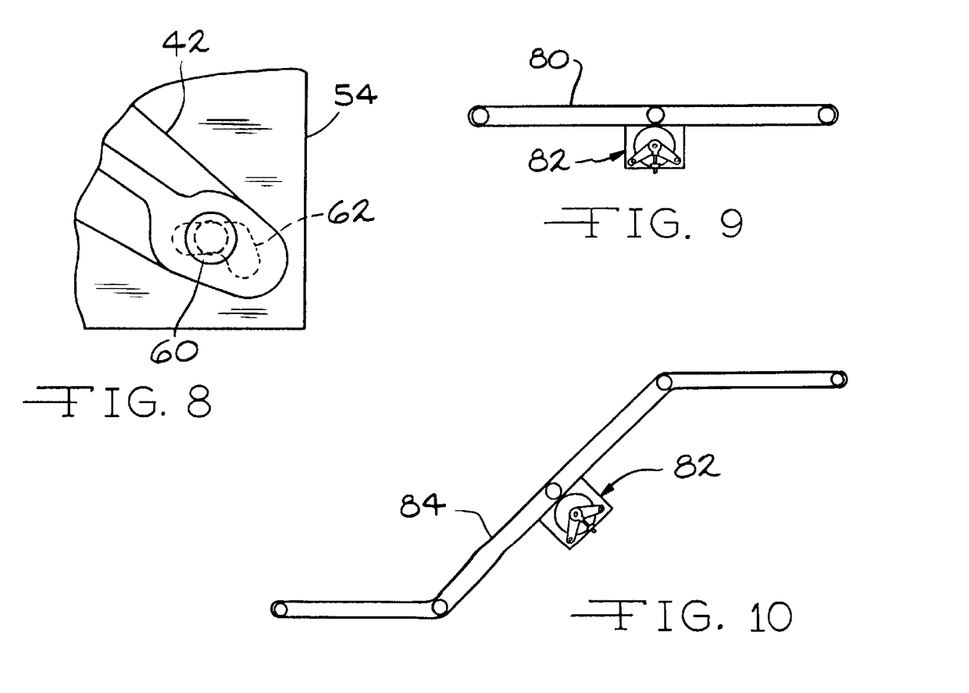
FIG. 8 is a schematic view in elevation of one of the arms wherein the hinge point is fixed on the arm, and the slot is positioned in the frame.
FIG. 9 is a schematic view in elevation of a straight conveyor in combination with the drive system of the invention.
FIG. 10 is a schematic view in elevation of an angled conveyor which is a Z conveyor in combination with the drive system of the invention.

The first and second pivot pins are shown as being fixed with respect to frame 54. It is to be understood that the pivot pins could easily be made fixed with respect to the first and second arms, and that the slots could be positioned in the frame, with the pivot pins being free to move within the slots. In FIG. 8, arm 42 has fixed hinge pin 60 (i.e., fixed with respect to the arm) which moves within opening 62 which is in frame 54. Also, the openings which are shown in FIGS. 1–6 as slots 46 and 50 in the first and second arms, respectively, can be of other configurations, such as the generally circular openings 64 in the frame 54 shown in FIG. 11. Also, the invention encompasses the situation where one pin is fixed to one arm, and the other pin is fixed to the frame.

As shown in FIGS. 3 and 5, the drive wheel 30 is mounted on a spring 66 which urges the drive wheel and the idler wheel toward each other, thereby establishing an initial biasing force or pinching on the belt passing through the nip. It is to be understood that the spring could just as well be mounted to urge the idler wheel toward the drive wheel, or that both the drive wheel and the idler wheel could be adapted with springs.

Figure 19:
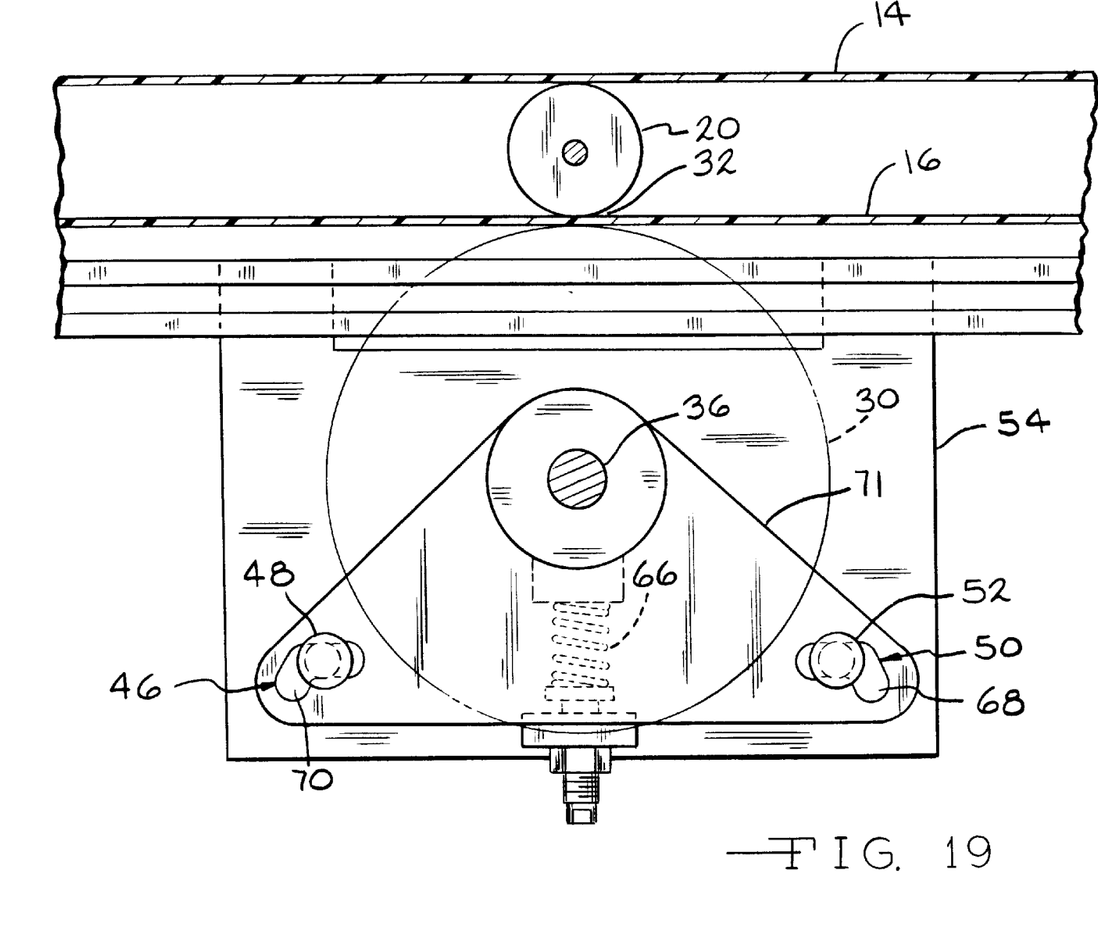
FIG. 19 is a schematic view in elevation of the drive system of the curved conveyor section similar to that shown in FIG. 3, but with the two arms replaced with a single pivot element.

The first and second slots 46 and 50 provide a second function beyond enabling the setting of a fulcrum or hinge point for the rotation of the arms 40 and 42. Since the first and second arms are shown as being a single piece and rigidly joined together, rotation of one of the arms necessarily means that the other arm must rotate along with it. Thus, counter-clockwise rotation of the first arm about first hinge pin 48 requires that the second arm also rotate in a counter-clockwise direction. It can be appreciated that the downward leg 68 in the second slot 50 enables the second arm and the second hinge pin 52 to move upward in a counter-clockwise direction. Likewise, the downward leg 70 of the first slot enables the first arm and the first hinge pin 48 to move upward in first slot 46. Without the freedom of movement provided by the downward legs 68 and 70, the rigidly connected arms 40 and 42 could not rotate as required to increase the pinch on the belt to prevent slipping. The arms 40 and 42 can be combined into a single pivot element, such as pivot element 71 shown in FIG. 19, which serves the function of both of the arms.

Figure 7:
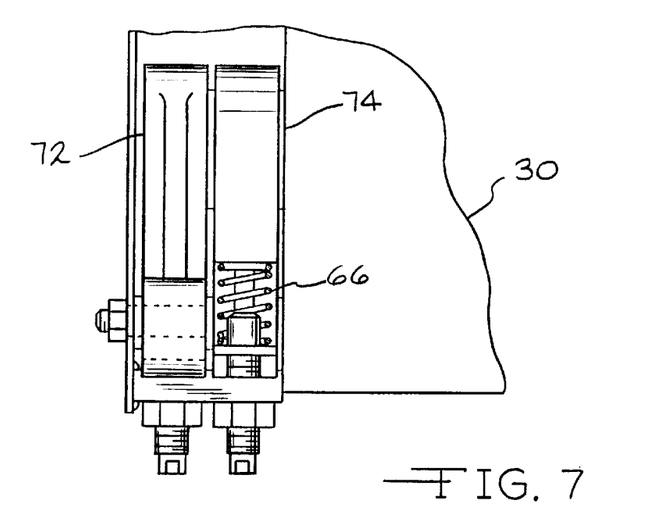
FIG. 7 is a schematic view in elevation similar to that shown in FIG. 4, but with the first arm axially separated from the second arm, and not rigidly connected to the second arm.

It is not necessary that the first and second arms be rigidly connected. As shown in FIG. 7, the first arm 72 and second arm 74 can be separate from each other, with one arm pointing in one direction of travel of the belt and the other arm oriented in the other direction. Each arm will act to prevent slip of the belt in one of two directions. Each arm can be mounted on a spring 66, and each arm can have an associated hinge pin and slot (or opening), not shown, to enable the rotation of the opposite arm.

Although the invention is shown in FIGS. 1–6 as being embodied in a curve conveyor system, it is to be understood that the drive system can be employed in other conveyors as well. As shown in FIG. 9, straight conveyor 80 is adapted to be driven by the drive system 82 of the invention, which includes a drive wheel, and idler wheel, and first and second arms similar to those previously disclosed. When the drive system of the invention is used on a straight conveyor, the drive system can be centered between the two longitudinal edges of the belt, rather than being positioned on the outer edge 22 in the case of a curved conveyor.

Another type of conveyor which can use the drive system of the invention is an angle conveyor in which the path of travel of the belt moves from one plane to another. One variation of the angle conveyor is a Z conveyor, shown as Z conveyor 84 in FIG. 10. In a Z conveyor the belt travels along a path in at least three different planes.

Figures 11, 12:
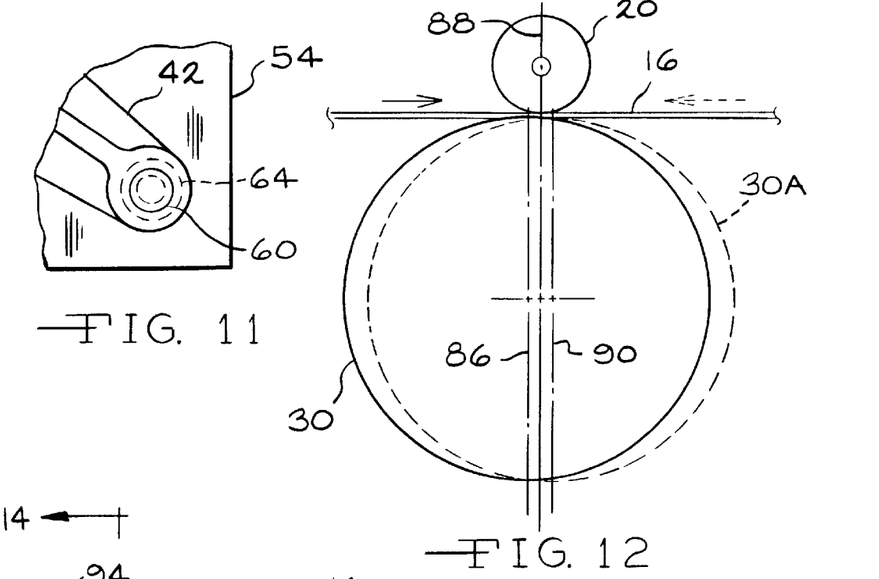
FIG. 11 is a schematic view in elevation of one of the arms wherein the hinge point is fixed on the arm, and an opening is positioned in the frame.
FIG. 12 is a schematic view in elevation of drive wheel and idler wheel similar to that shown in FIG. 3, but showing the two alternate positions of the drive wheel relative to the idler wheel.

One of the important aspects of the operation of the drive system of the invention, particularly where the first and second arms are rigidly connected, is the ability of the two arms to shift to the upstream direction in order to set the hinge pin in position to act as a fulcrum. As shown in FIG. 12, the drive wheel 30 has its centerline 86 slightly to the upstream side of the centerline 88 of the idler wheel 20. In this instance the drive wheel is rotating in a clockwise direction (as shown when viewing FIG. 12), and the belt is traveling from left to right, as indicated by the solid arrow. It has been found that a distance from the drive wheel centerline to the idler wheel centerline on the order of about ⅛ inches is adequate, although other distances may also be adequate.

When the drive wheel is reversed, with the belt traveling from right to left, the first and second arms, and the drive wheel itself shift to the new upstream direction, i.e., to the right as viewed in FIG. 12. The direction is indicated by the phantom arrow. The new position of the drive wheel is indicated by the dashed outline 30A. The centerline 90 of drive wheel 30A is to the right (as viewed in FIG. 12) or upstream side of the centerline of the idler wheel, since when the drive wheel is moving in a counter-clockwise direction the "upstream" side of the nip is the right hand side of FIG. 3. The distance from the idler wheel centerline to the centerline 90 of drive wheel 30A is also preferably about ⅛ inches.

It can be seen that the drive wheel shifts from one side to the other of the centerline of the idler wheel, depending on the direction of travel. In either case, the drive wheel is positioned on upstream side of the idler wheel centerline. The center of the drive wheel is upstream from the center of the idler wheel when the belt is traveling in the first direction, and the center of the drive wheel is upstream from the center of the idler wheel when the belt is traveling in the second direction.

Figures 13, 14:
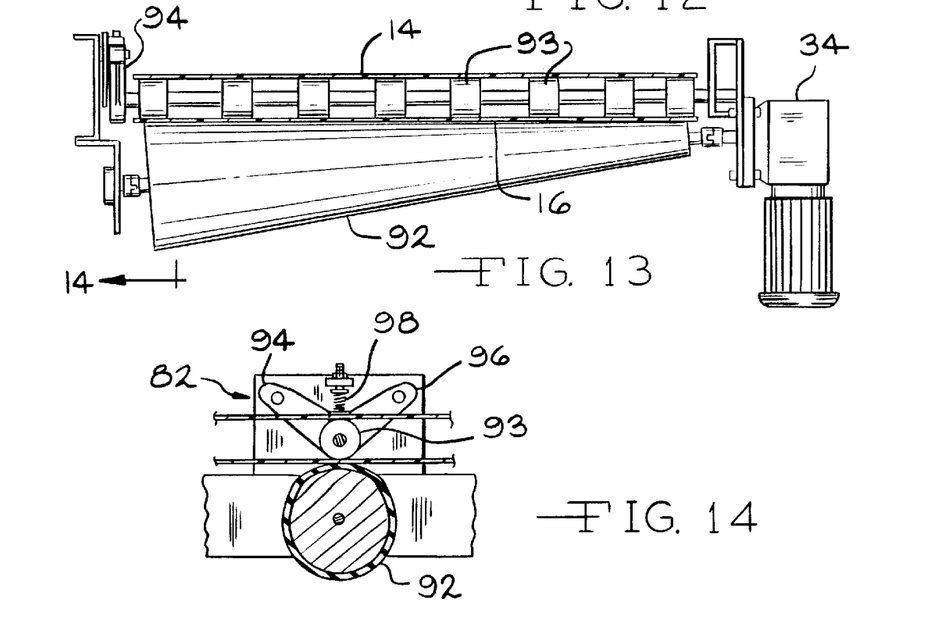
FIG. 13 is a schematic view in elevation of an embodiment of the invention in which the idler wheel is biased downwardly toward a tapered drive wheel.
FIG. 14 illustrates schematically the embodiment shown in FIG. 13, taken along line 14—14.

As shown in FIGS. 13 and 14, the drive wheel can have a width nearly equal to the width of the belt. Drive wheel 92 is tapered to accommodate differences in the drive speed of the inner and outer edges of the curve. The drive wheel can be driven by any suitable device, such as motor 34. The idler wheels 93 are preferably separated and freely moveable to accommodate differences in the drive speed of the inner and outer edges of the curve. Although the motor is shown connected to the drive wheel, the system can be operated just as well with the idler wheels being driven (in which case the idler wheel or wheels may need to be tapered). The idler wheel is shown being mounted on a support system including arms 94 and 96, and spring 98, similar to the support system shown in FIGS. 1–6. The spring provides an initial degree of pinch on the belt traveling through the nip, and the arms act to increase the pinch by rotation upon the sudden increase in tension in the belt.

Figure 15:
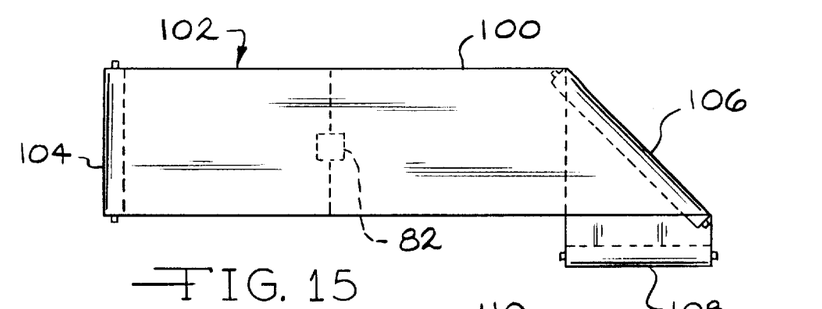
FIG. 15 is a schematic plan view of a merge conveyor in combination with the drive system of the invention.

The drive system of the invention is particularly suitable for use with a merge conveyor. As shown in FIG. 15, the drive system 82 moves belt 100 in merge conveyor 102. The belt travels around return roller 104 on one end, and travels around merge nose rollers 106 and a side return roller 108 at the other end of the merge conveyor. Use of the drive system of the invention enables the merge conveyor to operate in a reversible mode, and yet the belt is not placed under constant high tension. The belt in a merge conveyor under high tension is subject to rapid wear.

Figure 16:
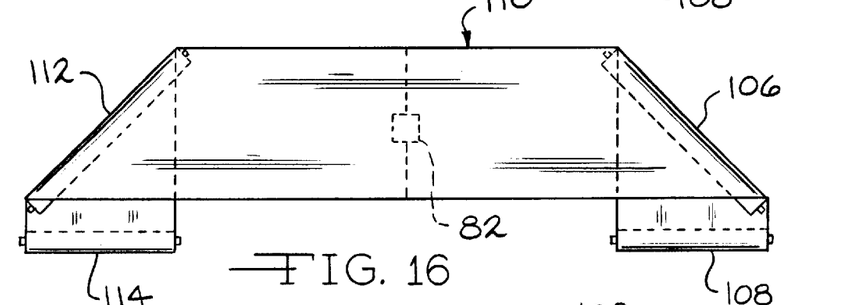
FIG. 16 is a schematic plan view of a double merge conveyor in combination with the drive system of the invention.
Figure 17:
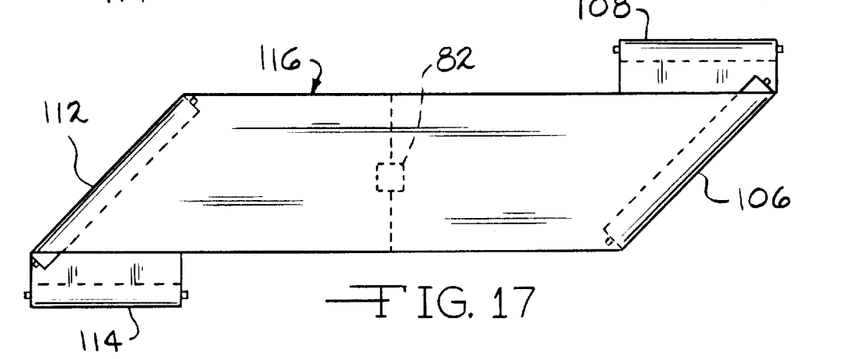
FIG. 17 is a schematic plan view of a double reverse merge conveyor in combination with the drive system of the invention.

As shown in FIG. 16, double merge conveyor 110 is provided with a nose at either end. As shown, the left end has merge nose rollers 112 and side return rollers 114. The belt is driven by a drive system 82 of the invention. The double reverse merge conveyor 116, as shown in FIG. 17, is similar to double merge conveyor 110, but with the nose of each end at generally similar angles. It is to be understood that the angles of the noses of any of the merge conveyors used with the invention can be 45 degrees or any other angle suitable for the operation in which the merge conveyor is used. It is also to be understood that although the double merge conveyor 110 and double reverse merge conveyor 116 are preferably operated with the drive system 82 of the invention, the double merge conveyor and double reverse merge conveyor can also be operated with a one-directional drive system.

Figure 18:
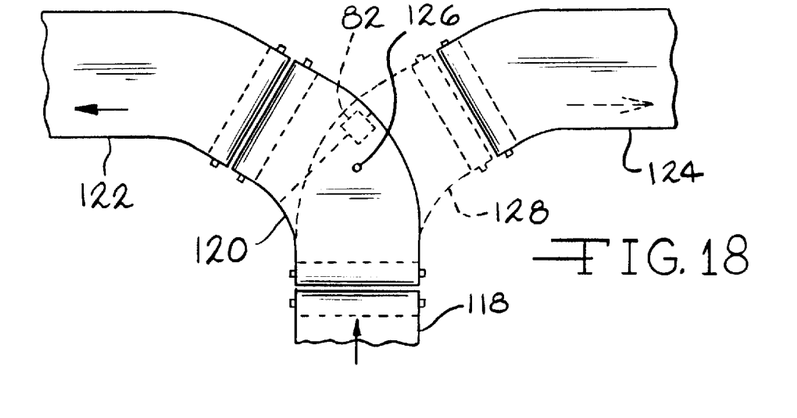
FIG. 18 is a schematic plan view of a curve switch system using a reversible conveyor of the invention.

The curve switch system shown in FIG. 18 provides an input conveyor 118, a curve conveyor 120 and an outlet conveyor 122. The curve conveyor provides a link from the input conveyor to the output conveyor. The curve conveyor is driven by the drive system 82 of the invention. In the event it becomes necessary to provide a link from the input conveyor 118 to the alternate output conveyor 124, the curve conveyor is lifted up, rotated about pivot point 126, and set down in place to provide a new path from the input conveyor to the alternate output conveyor. The new position is indicated as 128 in phantom lines. One item critical to the success of the curve switch system shown in FIG. 18 is the ability of the curve conveyor to be able to run in a reverse direction.

A general summary of the operation of the curve conveyor shown in FIGS. 1–6 is as follows: the motor drives the drive wheel 30 in a first direction, in a clockwise direction in FIG. 3, for example. The drive wheel and the first and second arms will be shifted to the left. Upon an increase in tension in the belt, the first arm 40 will rotate counter-clockwise about first hinge pin 48, thereby increasing the pinch on the belt in the nip region 32 and preventing backwards slip of the belt. Rotation of the first arm necessarily moves the second arm 42. Second hinge pin 52 moves upward in the second slot 50. When the motor is reversed, the drive wheel rotates counter-clockwise, and the drive wheel and the first and second arms will be shifted to the right. Upon an increase in tension in the belt, the second arm 42 will rotate clockwise about second hinge pin 52, thereby increasing the pinch on the belt in the nip region 32 and preventing backwards slip of the belt. Rotation of the second arm necessarily moves the first arm 40. The first hinge pin 48 moves upward in the first slot 46.

Figure 20:
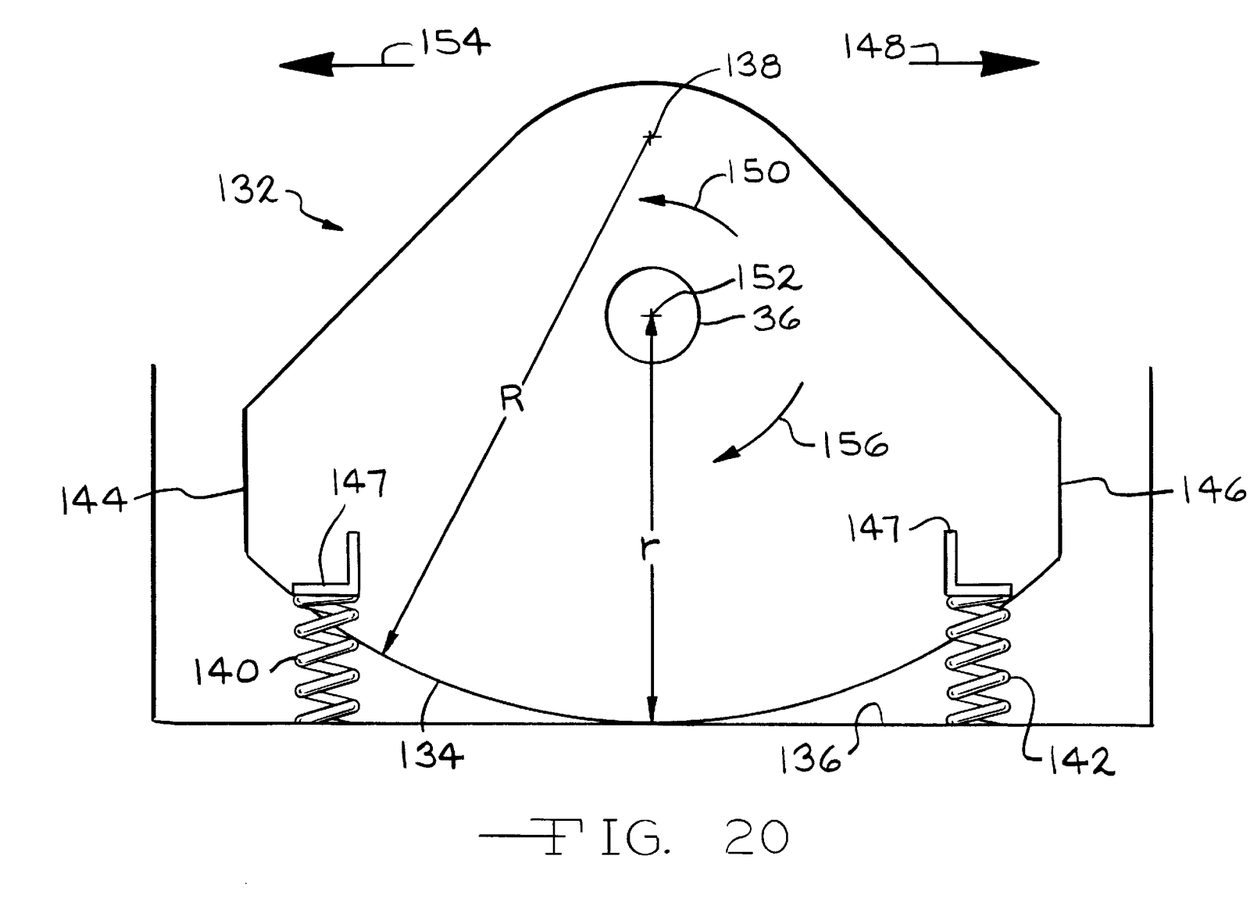
FIG. 20 is a schematic view in elevation of a drive system in which the support for the drive wheel is mounted for a rocking motion.

As shown in FIG. 20 the drive shaft 36 can be mounted in an arcuate-shaped support 132 which is mounted for a rocking motion. Preferably the arcuate support has an arcuate bottom edge 134 to enable rocking on surface 136. The center of curvature 138 of the arcuate bottom edge 136 is a radial distance R from the arcuate bottom edge. A pair of springs, such as first spring 140 and second spring 142 can be positioned at the first and second ends 144 and 146 respectively of the support. The springs establish an initial pinching of the conveyor belt, not shown in FIG. 20, by urging the drive wheel upwards, toward the idler wheel, also not shown. The rocker arm can be provided with welded angle brackets 147 which provide a surface upon which the springs can push to urge the rocker arm upwards. Alternatively, other means for attaching or positioning the springs can be used.

When the conveyor is traveling in a first direction 148, increased tension in the belt will cause the support to rock or rotate in a first arcuate direction 150. This motion is resisted by the first spring 140. Since the radius of curvature R of the arcuate bottom edge is greater than the distance r between the drive wheel axis 152 to the surface 136, rotation of the support 132 in the first arcuate direction 150 will cause the drive shaft to be raised up or elevated with respect to the surface 136. This will move the drive wheel and the idler wheel closer to each other, thereby increasing the pinching on the belt passing through the nip.

Likewise, when the conveyor is traveling in a second direction 154, increased tension in the belt will cause the support to rock or rotate in a second arcuate direction 156. This motion is resisted by the second spring 142. Since the radius of curvature R of the arcuate bottom edge is greater than the distance r between the drive wheel axis 152 to the surface 136, rotation of the support 132 in the second arcuate direction 156 will cause the drive shaft to be raised up or elevated with respect to the surface 136. This will move the drive wheel and the idler wheel closer to each other, thereby increasing the pinching on the belt passing through the nip.

It is to be understood that the rocker support 132 could be adapted to rock or rotate in only one direction, thereby supporting the drive wheel in a conveyor system where the conveyor belt is not reversible, but travels in only one direction.

Figure 21:
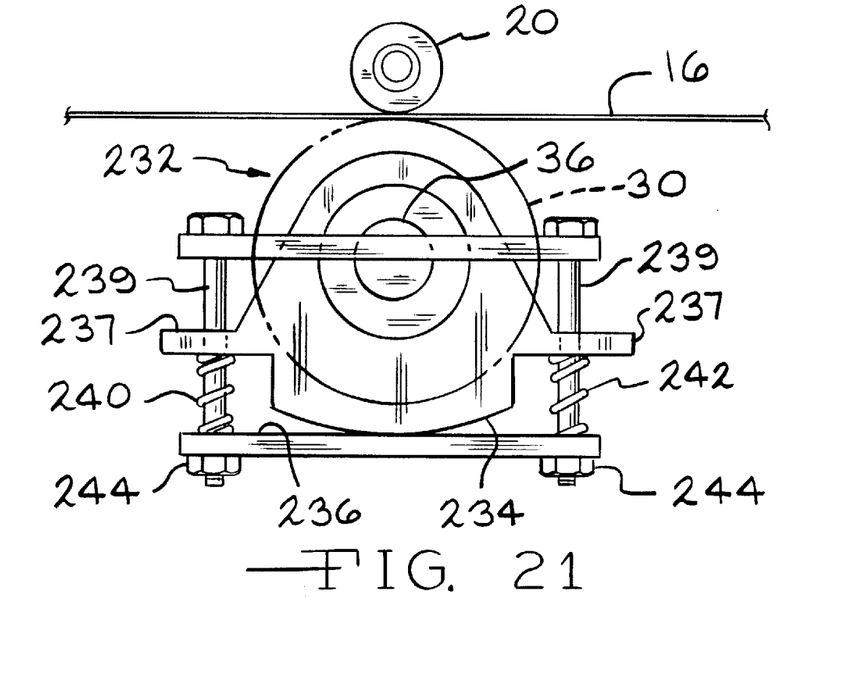
FIG. 21 is a schematic view in elevation of another drive system in which the support for the drive wheel is mounted for a rocking motion.

As shown in FIG. 21, the drive shaft 36 can be mounted in an arcuate-shaped support 232 which is mounted for a rocking motion in a manner similar to the embodiment shown in FIG. 20. The arcuate support has an arcuate bottom edge 234 to enable rocking on surface 236. The support 232 is provided with outboard flanges 237 which are provided with bores to be slidable on bolts 239. A pair of springs 240, 242 can be positioned concentrically on the bolts establish an initial pinching of the conveyor belt 16 by urging the drive wheel 30 upwards, toward the idler wheel 20. The bolts are provided with nuts 244 for threadably adjusting the tension on the rocker support 232.

Figure 22:
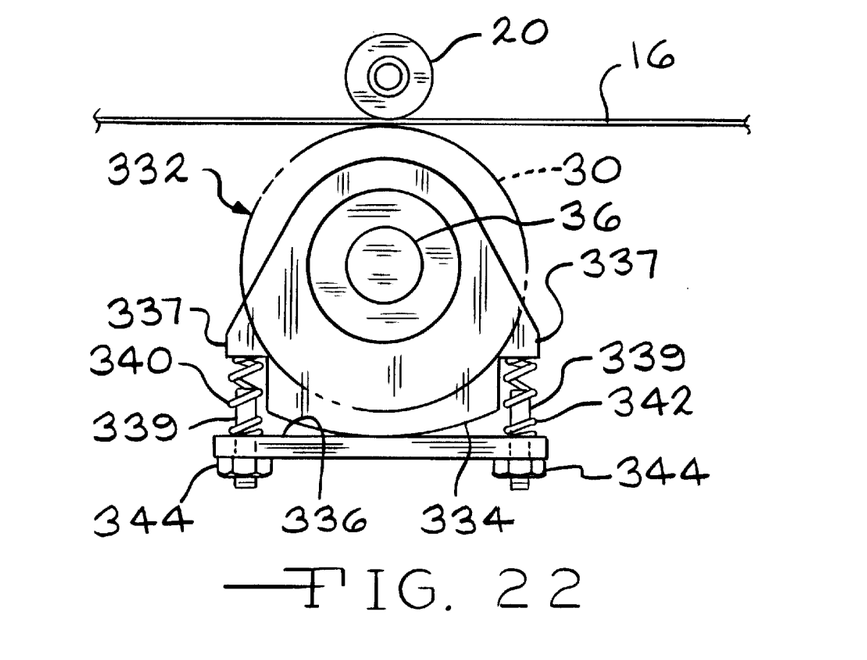
FIG. 22 is a schematic view in elevation of yet another drive system in which the support for the drive wheel is mounted for a rocking motion.

As shown in FIG. 22, the drive shaft 36 can be mounted in an arcuate-shaped support 332 which is mounted for a rocking motion in a manner similar to the embodiments shown in FIGS. 20 and 21. The arcuate support has an arcuate bottom edge 334 to enable rocking on surface 336. The support 332 is provided with outboard shoulders 337 which are provided with downwardly oriented surfaces. A pair of bolts 339 is mounted on the rocking surface 336. A pair of springs 340, 342 can be positioned concentrically on the bolts establish an initial pinching of the conveyor belt 16 by urging the drive wheel 30 upwards, toward the idler wheel 20. The bolts are provided with nuts 344 for threadably adjusting the tension on the rocker support 332.

It will be evident from the foregoing that various modifications can be made to this invention. Such, however are considered as being within the scope of the invention.

INDUSTRIAL APPLICABILITY

The invention is useful for driving conveyor systems for handling goods, and in particular for handling packages.

What is claimed is:

1. A reversible drive system for a conveyor comprising:
    a belt;
    a drive wheel;
    an idler wheel, where the drive wheel and the idler wheel are mounted for rotation on spaced apart axes to define a nip between the drive wheel and the idler wheel, with the belt being pulled through the nip by the rotation of the drive wheel; and
    a support on which the drive wheel is mounted, the support being mounted to enable a rocking motion, where rocking the support to cause the support to rotate in a first arcuate direction moves the drive wheel and the idler wheel closer to each other, thereby increasing the pinching on the belt passing through the nip, wherein increased tension on the belt causes rocking of the support which moves the drive wheel and the idler wheel closer to each other to increase the pinch on the belt, and where rocking the support to cause the support to rotate in a second arcuate direction moves the drive wheel and the idler wheel closer to each other, thereby increasing the pinching on the belt passing through the nip, wherein increased tension on the belt causes rocking of the support which moves the drive wheel and the idler wheel closer to each other to increase the pinch on the belt.

2. The drive system of claim 1 in which rotation of the support in the first arcuate direction acts to prevent slippage of the belt when the belt is traveling in the first direction, and rotation of the support in the second arcuate direction acts to prevent slippage of the belt when the belt is traveling in the second direction.

3. The drive system of claim 1 in which a pair of springs is positioned to urge the drive wheel and the idler wheel closer to each other, thereby establishing an initial pinching on the belt passing through the nip.

4. The drive system of claim 3 in which the support has an arcuate bottom edge to enable the rocking motion, and one spring is positioned at a first end of the arcuate bottom edge to resist rocking of the support in a first direction, and one spring is positioned at a second end of the arcuate bottom edge to resist rocking of the support in a second direction.

5. The drive system of claim 1 in combination with a straight conveyor.

6. The drive system of claim 1 in combination with an angled conveyor.

7. The drive system of claim 1 in combination with a curved conveyor.

8. The drive system of claim 1 in combination with a merge conveyor.

9. The drive system of claim 1 in combination with a curve switch conveyor system.

10. The drive system of claim 1 in combination with a double merge conveyor.

11. The drive system of claim 1 in combination with a double reverse merge conveyor.

12. A reversible drive system for a conveyor comprising:
    a belt;
    a drive wheel;
    an idler wheel, where the drive wheel and the idler wheel are mounted for rotation on spaced apart axes to define a nip between the drive wheel and the idler wheel, with the belt being pulled through the nip by the rotation of the drive wheel; and
    a support on which the drive wheel is mounted, the support having an arcuate bottom edge and being mounted to enable a rocking motion on a surface, where the radius of curvature of the arcuate bottom edge is greater than the distance from the drive wheel axis to the surface, where rocking the support to cause the support to rotate in a first arcuate direction moves the drive wheel and the idler wheel closer to each other, thereby increasing the pinching on the belt passing through the nip, wherein increased tension on the belt causes rocking of the support which moves the drive wheel and the idler wheel closer to each other to increase the pinch on the belt, and where rocking the support to cause the support to rotate in a second arcuate direction moves the drive wheel and the idler wheel closer to each other, thereby increasing the pinching on the belt passing through the nip, wherein increased tension on the belt causes rocking of the support which moves the drive wheel and the idler wheel closer to each other to increase the pinch on the belt.

13. A drive system for a conveyor comprising:

a belt;

a drive wheel;

an idler wheel, where the drive wheel and the idler wheel are mounted for rotation on spaced apart axes to define a nip between the drive wheel and the idler wheel, with the belt being pulled through the nip by the rotation of the drive wheel; and a support on which the drive wheel is mounted, the support being mounted to enable a rocking motion, where rocking the support to cause the support to rotate in a first arcuate direction moves the drive wheel and the idler wheel closer to each other, thereby increasing the pinching on the belt passing through the nip, wherein increased tension on the belt causes rocking of the support which moves the drive wheel and the idler wheel closer to each other to increase the pinch on the belt.

* * * * *